United States Patent
Kraus et al.

[15] 3,669,233
[45] June 13, 1972

[54] SIMULTANEOUSLY OR ALTERNATIVELY ENGAGED FLUID CLUTCHES

[72] Inventors: Helmut Kraus; Kurt Fadler, both of Schweinfurt am Main, Germany

[73] Assignee: Fichtel & Sachs AG, Schweinfurt am Main, Germany

[22] Filed: Feb. 18, 1971

[21] Appl. No.: 116,573

[30] Foreign Application Priority Data

March 4, 1970 Germany ................... 20 10 014.5

[52] U.S. Cl. ............ 192/87.11, 192/87.15, 192/48.91, 192/70.18
[51] Int. Cl. ................................................. F16d 25/10
[58] Field of Search ............ 192/87.11, 87.12, 87.13, 87.14, 192/48.8, 89 B, 70.18, 87.15, 87.1

[56] References Cited

UNITED STATES PATENTS

| | | | |
|---|---|---|---|
| 2,371,804 | 3/1945 | Cooke | 192/48.8 |
| 2,620,685 | 12/1952 | Smirl | 192/87.12 |
| 2,604,197 | 7/1952 | Livermore | 192/87.13 |
| 3,554,342 | 1/1971 | Spokas | 192/70.18 |
| 2,757,557 | 8/1956 | Hoffman | 192/87.15 |

*Primary Examiner*—Benjamin W. Wyche
*Attorney*—Kelman and Berman

[57] ABSTRACT

Torque is transmitted from an input shaft to either one or both of two coaxial output shafts by two input discs axially spaced and connected to the input shaft, two friction discs respectively secured on the output shafts against rotation while axially movable, and two pressure plates suspended from one of the input discs by tangentially elongated leaf springs, the friction discs and pressure plates being axially interposed between the input discs, and the pressure plates being moved toward and away from their inoperative positions by a hydraulic motor having annular pistons about the clutch axis which, with other wall elements, enclose the cylinder compartments of the motor.

8 Claims, 4 Drawing Figures

SIMULTANEOUSLY OR ALTERNATIVELY ENGAGED FLUID CLUTCHES

This invention relates to automotive power trains, and particularly to a dual clutch mechanism for selectively transmitting torque from an input shaft to one, the other, or both output shafts of the mechanism.

In its more specific aspects, the invention is concerned with improvements in a known, hydraulically operated clutch mechanism whose input shaft carriers a first input disc, a second input disc being fixedly fastened to the first disc in axially spaced relationship. Two friction discs and two pressure plates are interposed between the input discs, a first friction disc being arranged for axial, frictional engagement with the first input disc under the pressure of a first pressure plate, and the second friction disc being similarly capable of frictionally engaging the second input disc under the pressure of the second pressure plate. The two friction discs are secured against rotation on respective coaxial output shafts while being permitted to move axially. The pressure plates are axially movable, but secured to the input discs for joint rotation. The pressure plates are moved axially by a hydraulic motor.

The pressure plates of the known apparatus are connected to the input discs by means of external, circumferentially distributed teeth or ribs, similar to a gear rim, which are received in internal, axial grooves in an axial flange of the second input disc. The torque transmitted from the input discs to the pressure plates and the axial forces exerted by the hydraulic motor on the pressure plates cooperate to cause relatively fast frictional wear of the engaged elements, and the force applied for engaging and disengaging the clutch is converted to a significant extent to heat and spent in the gradual destruction of the engaged parts.

It is the primary object of this invention to overcome the shortcomings of the known apparatus.

With this object and others in view, as will hereinafter become apparent, the clutch mechanism of the invention is provided with elongated, flat leaf springs which secure the pressure plates to the second input disc, respective longitudinal end portions of each leaf spring being attached to a face of the second input disc directed toward the first input disc, the other longitudinal end portion being attached to a face of the associated pressure plate directed away from the first input disc.

Other features, additional objects, and many of the attendant advantages of this invention will readily become apparent as the same is better understood by reference to the following detailed description of a preferred embodiment, when considered in connection with the appended drawing in which.

Figure 1:
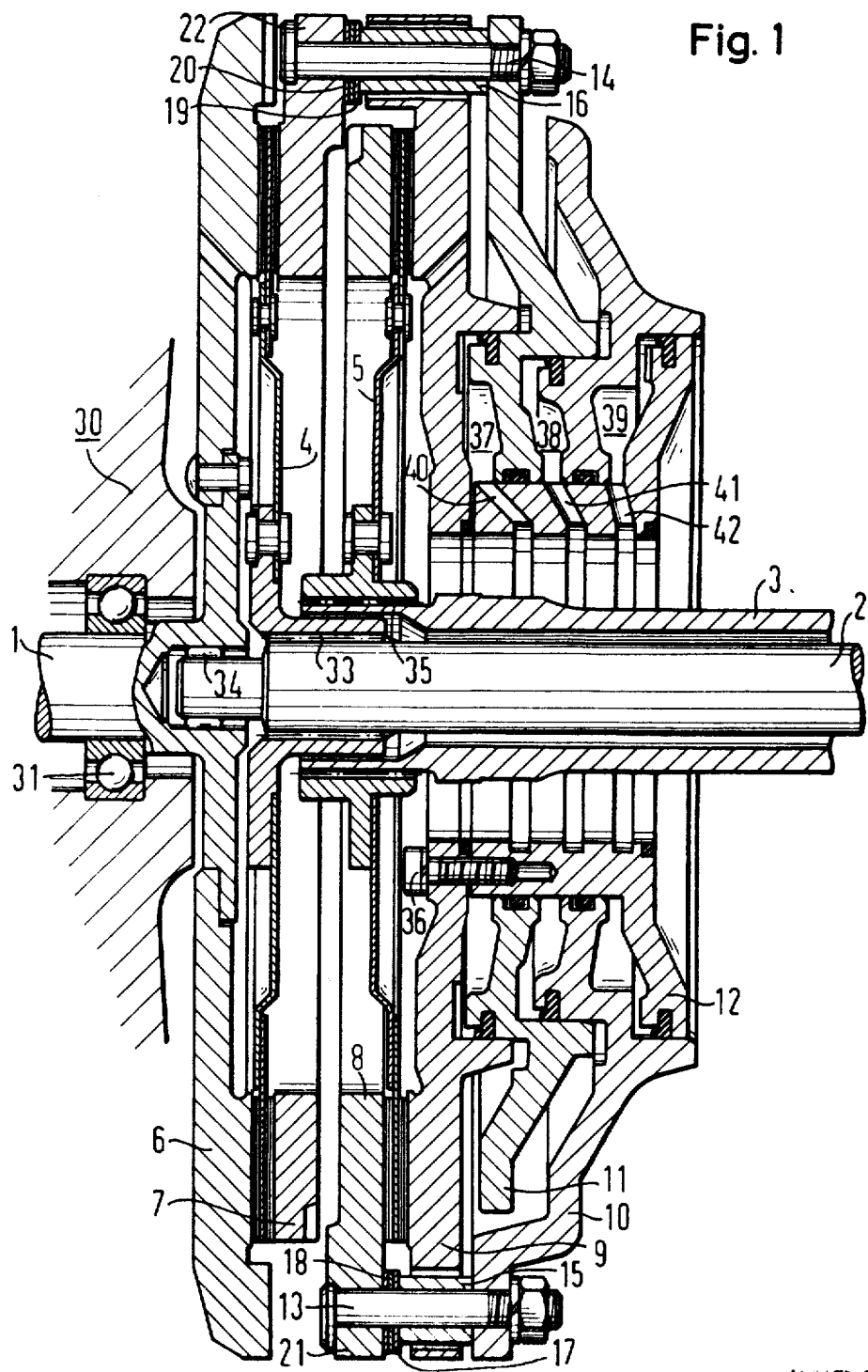
FIG. 1 shows a dual clutch mechanism of the invention in side-elevational, axial section.
Figure 2:
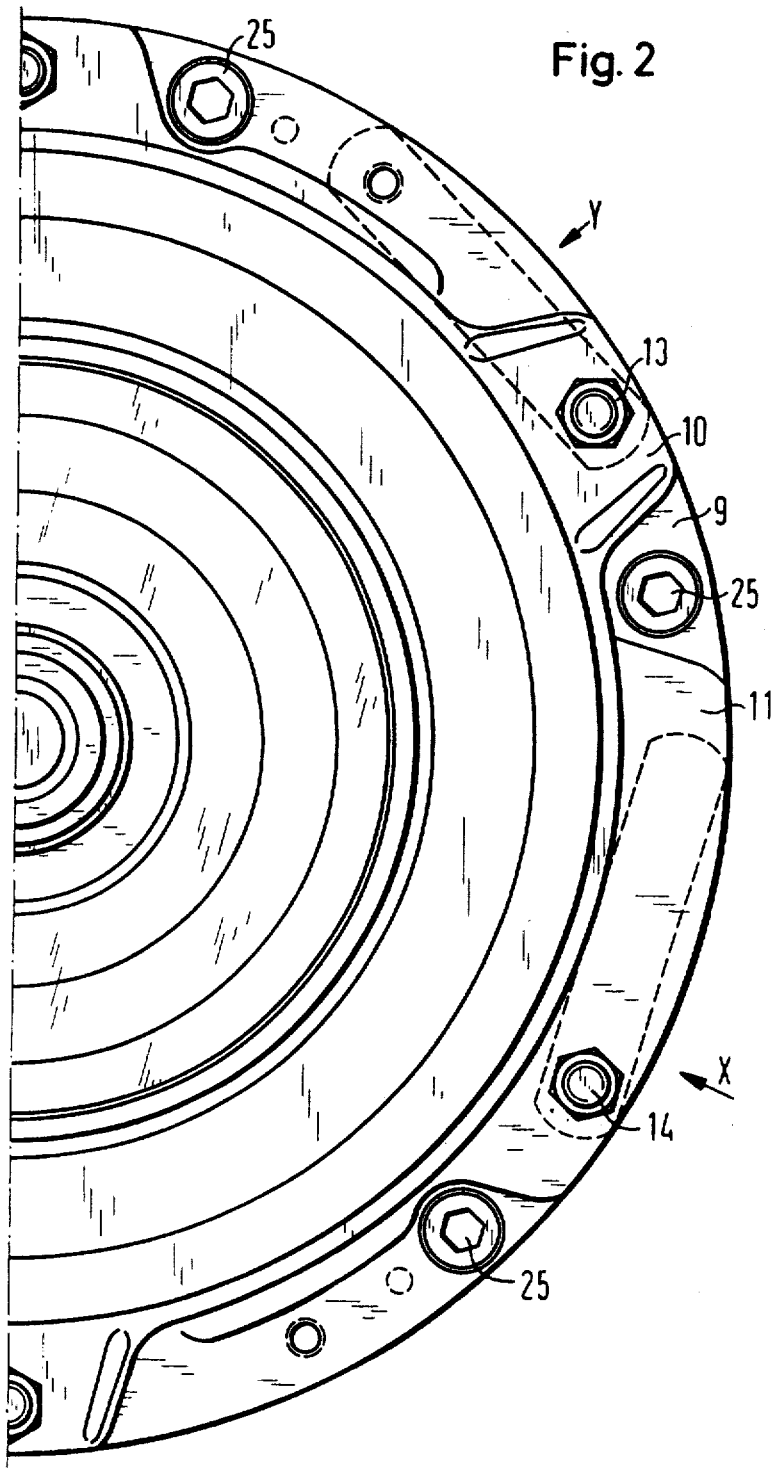
FIG. 2 shows one half of the mechanism in rear elevation.

Referring now to the drawing in detail and initially to FIGS. 1 and 2, there is seen as much of an automotive power train as is necessary for an understanding of this invention. The output shaft 1 of a hydraulic torque converter is journaled in the converter casing 30 by a ball bearing 31 and simultaneously constitutes the input shaft of the clutch mechanism which is more fully illustrated. The mechanism has two output shafts 2,3 coaxial with the input shaft 1 and carrying respective friction discs 4,5, the discs being secured on the respective output shafts by splines 33, 35 for joint rotation while being permitted to move axially.

The shaft 3 is tubular and receives a part of the shaft 2 in its bore. The projecting front end of the shaft 2 is journaled in a needle bearing 34 in a recess of a first input disc 6 fixedly mounted on the input shaft 1. The friction disc 4 is axially interposed between a radial engagement face of the input disc 6 and an opposite face of an annular first pressure plate 7. The second friction disc 5 is similarly interposed between a second pressure plate 8 and a second input disc 9. Circumferentially distributed bolts 25 (FIGS. 2 to 4) fixedly connect the input discs 6,9 in axially spaced relationship.

The hydraulic motor which operates the pressure plates and thereby couples the input shaft 1 to the output shaft 2 or the output shaft 3 or to both output shafts is mounted on the rear face of the second input disc 9. Its axially movable parts are two annular, disc-shaped pistons 10,11 provided with annular shoulders having inner and outer cylindrical faces. They are guided in sealing engagement on a flanged sleeve 12 attached to the second input disc 9 by bolts 36.

An annular rim on the rear face of the disc 9 slidably engages the outer cylindrical shoulder face on the piston 11 so that the disc 9, the piston 11, and the cylindrical face of the sleeve 12 define an annular compartment 37. A second annular compartment 38 is bounded by the sleeve 12 and the two pistons 10, 11, the outer, cylindrical shoulder face of the piston 10 being sealed in sliding engagement to the inner corresponding face of the piston 11. A third compartment 39 is similarly bounded by the piston 10, the cylindrical face of the sleeve 12 and the flange of the latter.

The hydraulic system which may supply oil under pressure to each of the compartments 37,38,39 includes a sump, a pump which draws oil from the sump, and three control valves connected to the sump, the pressure outlet of the pump, and to three conduits 40,41,42 in the sleeve 12 in a conventional manner for individually feeding oil to the three compartments or for draining them to the sump, only the rotating conduits 40,41,42 of the otherwise stationary system being shown in the drawing.

Two sets 13,14 of axially elongated, circumferentially distributed bolts extend from peripheral portions of the pistons 10, 11 forward to transmit motion from the pistons to the pressure plates 7,8. Each bolt 13 passes through axially aligned apertures in the piston 10, the second input disc 9, and a radially projecting lug 21 on the pressure plate 8 and carries a head on one end and a nut on the other end to prevent the piston 10 and the pressure plate 8 from moving axially apart. A spacer sleeve 15 and a washer 17 are axially interposed on the bolt 13 between the piston and the pressure plate to hold them at a fixed distance, the aperture in the input disc 9 being dimensioned to pass the sleeve 15 with ample clearance.

The piston 11 and radially projecting lugs 22 on the pressure plate 7 are similarly connected by the bolts 14 with associated spacer sleeves 16 and washers 19. The washers 17,19 clamp leaf springs 18,20 to the pressure plates 8,7 respectively.

Figure 3:
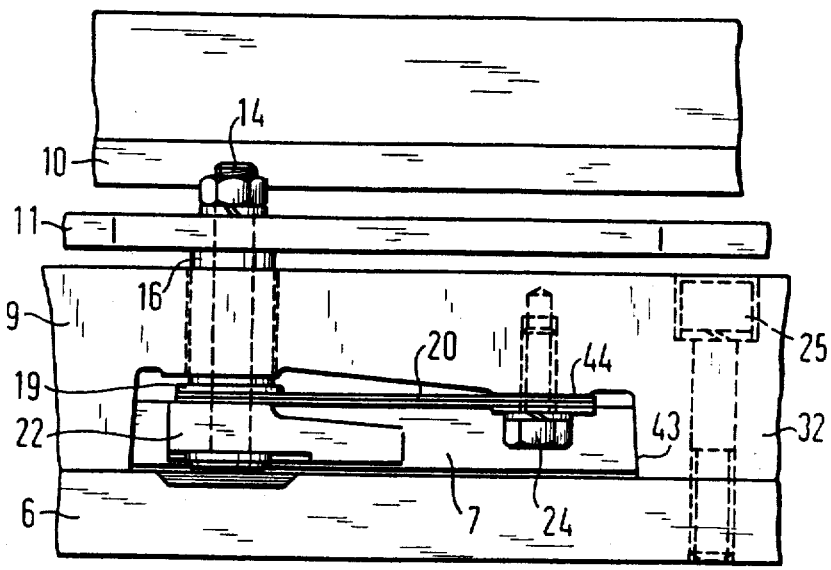
FIGS. 3 and 4 illustrate portions of the mechanism in views taken in the direction of radial arrows X and Y respectively in FIG. 2.
Figure 4:
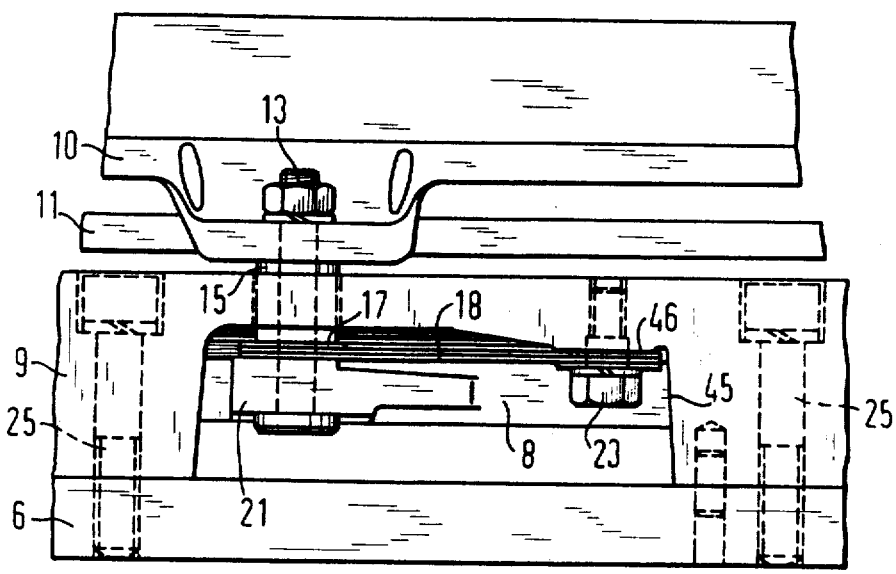

As is better seen in FIGS.3 and 4, an integral axial flange 32 projects from the second input disc 9 into abutting engagement with the input disc 6 under the pressure of the bolts 25. Three notches or recesses 43 and three notches or recesses 45 are cut axially into the flange 32. The circumferential length of the radially open recesses is sufficient that the recesses 43 can receive the leaf springs 20, and the recesses 45 can receive the leaf springs 18. The leaf springs are circumferentially elongated substantially tangentially relative to a common circle about the clutch axis, and their widths extend in radial planes respectively common to the springs 18,20.

The lugs 21,22 radially project from the associated pressure plates 8,7 into the recesses 45,43, and the bolts 13,14 enter the recesses in an axial direction for clamping end portions of respective springs 18,20 between the spacer sleeves 15,16 with washers 17 and the lugs 22,21. The other longitudinal end portion of each spring 18 is clamped in a recess 45 to a radial face 46 of the second input disc 9 by a screw 23, and the springs 20 are similarly clamped by screws 24 to radial faces 44 of the second input disc 9 which bound the recesses 43. The pressure plates 7,8 are thus each suspended from the second input disc 9 by means of three leaf springs 18,20 equiangularly distributed about the pressure plate circumference. They permit the associated pressure plate to move axially under the force of the hydraulic motor while coupling the plates to the input disc 9 for joint rotation.

The friction losses in this coupling connection during operation of the clutch mechanism are negligible. The connection is not subject to significant wear over long periods regardless of the magnitude of the torque to be transmitted by the clutch mechanism. The leaf springs are helpful in lifting the frictionally retained pressure plates from the driven friction discs. The cost of the leaf spring coupling of the invention is but a fraction of the cost of machining teeth and grooves into the pressure plates and the input discs. The leaf spring coupling does not materially increase the axial length of the clutch mechanism because the springs are arranged in respective radial planes, and their axial dimension of thickness is very small. Because of their essentially tangential orientation, the leaf springs are not subjected to significant longitudinal stresses during axial movement of the associated pressure plates by the hydraulic motor.

During assembly of the clutch mechanism, labor is saved by first assembling the second input disc with both pressure plates, the second driven friction disc, and the hydraulic motor. This subassembly and the first friction disc are then bolted to the first input disc.

The threaded bores in the second input disc 9 which are required for fastening the two sets of leaf springs 18,20 by means of the screws 23,24 are axially accessible in the disc 9 from the same side. They may therefore be drilled and threaded automatically in a single operation, and all springs may be placed in position and attached to the input disc without moving the latter. No separate fasteners are required for attaching the other ends of the springs to the pressure plates 7,8 by using the spacer sleeves 15,16 as clamping elements for the springs. The material savings and weight reduction resulting from this dual function of the motion transmitting elements on the bolts 13,14 are economically significant.

The mode of operation of the illustrated apparatus will be obvious to those skilled in the art. The setting of the non-illustrated valves connected to the chambers 37,38,39 will determine whether any torque is transmitted from the input shaft 1, and whether the torque is transmitted only to the shaft 2, only to the shaft 3, or to both output shafts.

While the invention has been described in its application to an automotive power train and has been found very advantageous in such an application, it will be appreciated that it is not limited to any specific use and may be employed whereever one driving member is to be connected to a first driven member, a second driven member, or both driven members. The unit may also be installed in such a manner that two sources of motive force are connected to the shafts 2,3 for driving a load connected to the shaft 1 alternatively or jointly, and the terms "input" and "output," as used throughout this specification and the attached claims are chosen for the convenience of identification only and do not limit the invention to the flow of torque through the clutch mechanism in any specific direction.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A clutch mechanism comprising, in combination:
    a. a first input disc having an axis and mounted for rotation about the axis thereof;
    b. a second input disc fixedly fastened to said first disc in axially spaced relationship;
    c. a first output shaft and a second output shaft rotatable about said axis;
    d. two friction discs and two pressure plates axially interposed between said input discs,
        1. a first one of said friction discs being secured on said first output shaft for joint rotation while free to move axially toward and away from frictional engagement with said first input disc,
        2. the second friction disc being secured on said second output shaft for joint rotation while free to move axially toward and away from frictional engagement with said second input disc;
    e. securing means securing said pressure plates to said input discs for rotation with the same while permitting axial movement of said pressure plates toward and away from respective operative positions in which a first one of said pressure plates holds said first friction disc in frictional engagement with said first input disc, and said second pressure plate holds said second friction disc in frictional engagement with said second input disc,
        1. said securing means including two sets of elongated leaf springs having each a first longitudinal end portion attached to a face of said second input disc directed toward said first input disc, the second longitudinal end portions of the springs in a first one of said sets being attached to a face of said first pressure plate directed away from said first input disc, and the second longitudinal end portions of the springs in the second set being attached to a face of said second pressure plate directed away from said first input disc; and
    f. hydraulically operated motor means for moving each of said pressure plates toward and away from said operative position thereof and relative to the other pressure plate.

2. A mechanism as set forth in claim 1, wherein each of said leaf springs is elongated substantially tangentially relative to a circle centered in said axis.

3. A mechanism as set forth in claim 2, wherein said leaf spring extends substantially in a plane radial relative to said axis, the dimension of leaf thickness being axial.

4. A mechanism as set forth in claim 1, wherein said second input disc has a cylindrical, circumferential flange portion axially projecting from the central portion of said second input disc toward said first input disc, said flange portion being formed with recesses respectively bounded by said faces of the second input disc and receiving said leaf springs, respective radial lugs extending from said pressure plates into said recesses and being fastened to the leaf springs therein.

5. A mechanism as set forth in claim 1, wherein said motor means are axially offset from said second input disc in a direction away from said first input disc and include two axially movable piston members annular about said axis, wall means defining a plurality of axially offset compartments jointly with said piston members, a hydraulic supply system communicating with said compartments for supplying fluid under pressure to each compartment while withdrawing fluid from another compartment, and a plurality of motion transmitting means respectively connecting said piston members to said pressure plates, each motion transmitting means including a motion transmitting member fastening one of said leaf springs to the associated pressure plate.

6. A mechanism as set forth in claim 5, wherein said motion transmitting member is axially elongated and passes through respective bores in said second input disc and the associated pressure plate, said motion transmitting means further including a spacer sleeve enveloping said motion transmitting member, said one leaf spring being clamped between said associated pressure plate and said spacer sleeve.

7. A mechanism as set forth in claim 6, further comprising an input shaft coaxial with said output shafts, said input shaft being fixedly attached to said first input disc and extending axially from the same in a direction away from said second friction disc.

8. A mechanism as set forth in claim 7, wherein said second input disc has a cylindrical circumferential flange portion axially projecting from the central portion of said second input disc toward said first input disc, said flange portion being formed with recesses respectively bounded by said faces of the second input disc and receiving said leaf springs, respective radial lugs extending from said pressure plates into said recesses and being fastened to the leaf springs therein, each leaf spring being elongated substantially tangentially relative to a circle about said axis and extending substantially in a radial plane through said axis, the dimension of leaf thickness being axial.

* * * * *